United States Patent Office 2,703,913
Patented Mar. 15, 1955

2,703,913
PRECISION CASTING

Joseph Hinde, Fishponds, Bristol, and Dennis Frederick Bernard Tedds, Filton Park, Bristol, England, assignors to The Bristol Aeroplane Company Limited, Bristol, England, a British company No Drawing. Application February 5, 1951,
Serial No. 209,526

Claims priority, application Great Britain
February 6, 1950

2 Claims. (Cl. 22—196)

This invention relates to the production of refractory moulds for precision casting by the "lost-wax" method, in which a refractory mould is formed on a pattern made of wax or other easily removable or destructible material. It has hitherto been the practice to coat the pattern, by spraying or dipping, with a mixture of a finely powdered refractory filler and a binding agent to give a smooth surface-finish to the inner surface of the mould, and then to invest the coated pattern with a suitable setting mixture in which ethyl silicate and alcohol were essential ingredients. Ethyl silicate in a mixture with alcohol is highly inflammable and one object of the present invention is to provide a method of making molds for precision casting which limits its use as far as possible, thereby avoiding the risk of fire or explosion.

One preliminary coating for the pattern is a mixture of 100 cc. emulsion liquid with 9 ozs. of alumina. The alumina is finely ground to pass a 200 mesh B. S. sieve, and the emulsion liquid comprises 12.5 grams soap flakes, 1600 cc. water, 400 cc. sodium silicate "S" brand, 1.2 specific gravity, and 15 cc. octyl alcohol, but the present invention is not limited to this particular coating as many variants are possible. For example, instead of soap flakes as a wetting agent, 10 cc. of a substance known by the trade name "Teepol" may be used, and de-foaming agents other than octyl alcohol can be used.

According to this invention a method of making a refractory mould comprises the steps of (a) coating the pattern with a mixture as above described, (b) allowing the coating to dry, (c) investing the coated pattern in a moulding box with a slurry comprising sand, cement and water, (d) subjecting the invested pattern to vibration to consolidate the investment, (e) removing the excess water, and (f) drying and baking the mould.

A preferred method according to this invention comprises the steps of (a) coating the pattern with an emulsion liquid comprising a finely divided refractory material and a non-toxic binder such as sodium silicate, (b) applying to the coating while still wet a material in dry powdered form to roughen the surface and/or absorb excess liquid, (c) drying the coating, (d) treating the coating with ethyl silicate or a solution thereof, (e) drying the coated and treated pattern, (f) investing it in a water-setting sand-and-cement mixture, (g) subjecting the invested pattern to vibration to consolidate the investment, (h) removing the excess water, and (i) drying and baking the mould.

The treatment of the coating with ethyl silicate is preferably effected by dipping, rather than by spraying or painting, since the difficulties arising from the nature of ethyl silicate, as above-mentioned, are thereby reduced. The coated pattern may be dipped in neat ethyl silicate, or in an alcohol solution of ethyl silicate, or in an ethyl silicate-alcohol-water solution preferably hydrolised before use by any suitable method, such as allowing it to stand for a period of not less than twelve hours, or by passing it through an emulsifying machine.

When the ethyl silicate-alcohol solution is used, it should comprise not less than about one-third ethyl silicate. The term ethyl silicate is intended to cover compounds such as tetraethyl orthosilicate and "condensed" ethyl silicate which are known commercially under the generalised description "ethyl silicate."

The preliminary coating of the wax pattern is intended to give a very smooth inner surface to the mould when it is ready for use, and the powdered alumina mentioned above is therefore finely ground, passing a 200 mesh sieve, but this coating is required to adhere adequately to the investment material with which it is finally surrounded; for this purpose it is desirable to roughen it, and the dry material applied to the coating in step (b) of the preferred method may be the same fine powder as is used for the filler in the coating, or alternatively it may be more coarsely ground. It is also possible to use crushed coke, activated carbon, active alumina or silica gel, all these materials having the additional advantage of absorbing emulsion liquid and therefore facilitating the drying of the coating and improving the bonding of the powder to the coating and to the investment. Refractory or oxidisable metal powders, for example nickel or aluminium, of about 30 grade, have also been used with satisfactory results.

After air-drying for at least one hour, rather longer being necessary where using non-absorbent dry coating material, the coated pattern is dipped, preferably in neat ethyl silicate, in order to strengthen the preliminary coating and render it water-resistant, and it is again allowed to dry. The action of the ethyl silicate is that in the presence of water, which may be absorbed from the atmosphere if not present in solution, it is slowly hydrolized to alcohol and silicic acid, and the latter in turn dehydrates to an amorphous form of silica. When the neat ester is used a proportion of highly condensed resinous compounds is also formed which preserves some flexibility in the coating until in the final firing of the mould it is reduced to silica.

The destructible pattern with its coating is then air-dried for a period of at least one hour. If it is desired to make this coating thicker the treatment may be repeated including the step of dipping in ethyl silicate, as many times as desired, to build up the desired thickness, and the final coating is then dried.

The coated pattern is invested in a moulding box with a slurry comprising sand, cement and water.

Specific mixtures which have been proved to give satisfactory results as the investment material are as follows:

1.
85% Sillimanite—50 D. E. S. Grade
10% cement
5% water 2.
70% Molochite No. 30 Grade
30% Molochite No. 6 Grade To this mixture is added 5%/30% cement, and sufficient water to make a mixture of slurry consistency.

3.
74% Molochite No. 30 Grade
17½% cement
8½% water

The cement abovementioned may be Portland cement, but any other water-setting cement may be used, and in particular cements which are capable of withstanding high temperatures.

After investment, the pattern with its coating and investment is subjected to vibration to consolidate the investment and separate any excess water, which is removed, and the whole mould is then air-dried and baked. During the baking process the pattern of wax or other destructible material is melted or burned out, and the mould is then ready for use.

This invention has the particular advantage that the use of large quantities of ethyl silicate and alcohol, as would be required if they were used for the investment slurry, is avoided, and that their use for the treatment of the preliminary coating by dipping is relatively innocuous.

We claim:
1. A method of making a refractory mould which comprises the steps of (a) coating the pattern with a mixture comprising a finely divided refractory material and a non-toxic binder, (b) applying to the coating while still wet a material in dry powdered form to roughen the surface, (c) drying the coating, (d) dipping the coated pattern in an ethyl silicate solution, (e) drying the coated and treated pattern, (f) investing it with a slurry made by adding water to a dry mixture comprising at least 70% by weight of granular refractory material not reactive with water and the remainder consisting principally of Portland cement, (g) subjecting the invested pattern to vibration to consolidate the investment, (h) removing the excess water, and (i) drying and baking the mould.

2. A method of making a refractory mould which comprises the steps of (a) coating the pattern with a mixture comprising a finely divided refractory material and a non-toxic binder, (b) applying to the coating while still wet a material in dry powdered form to roughen the surface, (c) drying the coating, (d) dipping the coated pattern in neat ethyl silicate, (e) drying the coated and treated pattern, (f) investing it with a slurry made by adding water to a dry mixture comprising at least 70% by weight of granular refractory material not reactive with water and the remainder consisting principally of Portland cement, (g) subjecting the invested pattern to vibration to consolidate the investment, (h) removing the excess water, and (i) drying and baking the mould.

References Cited in the file of this patent

UNITED STATES PATENTS

| | | |
|---|---|---|
| 716,491 | Spence | Dec. 23, 1902 |
| 1,767,351 | Dalton et al. | June 24, 1930 |
| 2,027,932 | Ray | Jan. 14, 1936 |
| 2,388,299 | Thielemann | Nov. 6, 1945 |
| 2,491,096 | Feagin | Dec. 13, 1949 |